United States Patent
Park et al.

(10) Patent No.: US 11,429,963 B2
(45) Date of Patent: Aug. 30, 2022

(54) PRE-APPROVAL FINANCIAL TRANSACTION PROVIDING SYSTEM AND METHOD THEREFOR

(71) Applicant: HAREX INFOTECH INC., Seoul (KR)

(72) Inventors: Kyung Yang Park, Seoul (KR); Dae Yeon Kim, Seoul (KR); Moon Ho Yang, Gyeonggi-do (KR); Hoon Joon Jung, Gyeonggi-do (KR)

(73) Assignee: HAREX INFOTECH INC., Seoul (KR)

( * ) Notice: Subject to any disclaimer, the term of this patent is extended or adjusted under 35 U.S.C. 154(b) by 84 days.

(21) Appl. No.: 16/096,943

(22) PCT Filed: Apr. 27, 2017

(86) PCT No.: PCT/KR2017/004479
§ 371 (c)(1),
(2) Date: Oct. 26, 2018

(87) PCT Pub. No.: WO2017/188747
PCT Pub. Date: Nov. 2, 2017

(65) Prior Publication Data
US 2019/0095912 A1    Mar. 28, 2019

(30) Foreign Application Priority Data
Apr. 27, 2016   (KR) .................. 10-2016-0051559

(51) Int. Cl.
*G06Q 20/40*     (2012.01)
*G06F 21/32*     (2013.01)
(Continued)

(52) U.S. Cl.
CPC ............. *G06Q 20/40* (2013.01); *G06F 21/32* (2013.01); *G06F 21/33* (2013.01); *G06F 21/42* (2013.01);
(Continued)

(58) Field of Classification Search
CPC ........ G06Q 40/00; G06Q 40/20; G06Q 40/08; G06Q 20/00
See application file for complete search history.

(56) References Cited

U.S. PATENT DOCUMENTS 7,624,280 B2    11/2009  Oskari
7,634,280 B2 *  12/2009  Modeo .............. H04W 12/0804
                                                455/466
(Continued)

FOREIGN PATENT DOCUMENTS

| CN | 102227741 A | 10/2011 |
|---|---|---|
| CN | 104680371 A | 6/2015 |

(Continued)

OTHER PUBLICATIONS

Lauren Darcey, "Learning Android Application Programming for the Kindle Fire—A Hands-on Guide to Building Your First Android Application" p. 216-217 published by Addison Wesley (Jul. 2012)—URL: https://www.google.com/books/edition/Learning_Android_Application_Programming/32mppQEdKDEC?hl=en (Year: 2012).*
(Continued)

*Primary Examiner* — Bennett M Sigmond
*Assistant Examiner* — Xavier M. Bennett
(74) *Attorney, Agent, or Firm* — Sughrue Mion, PLLC

(57) ABSTRACT

The present invention relates to providing a financial transaction and, more particularly, to a system and method for proceeding with a financial transaction in a financial terminal such as an automated teller machine (ATM) using an approval number resulting from pre-approval. The present
(Continued)

invention is directed to providing a system and method for proceeding with a financial transaction, such as a cash withdrawal or a purchase of a gift certificate, by obtaining transaction approval in advance with a portable terminal through communication with a financial institution server or the like and then transferring only a result of the transaction approval to an ATM or the like.

13 Claims, 4 Drawing Sheets

(51) Int. Cl.
*G06F 21/33* (2013.01)
*G06F 21/42* (2013.01)
*G06Q 20/32* (2012.01)
*G06Q 20/10* (2012.01)
*G07F 19/00* (2006.01)
*H04L 9/40* (2022.01)

(52) U.S. Cl.
CPC ....... *G06Q 20/1085* (2013.01); *G06Q 20/325* (2013.01); *G06Q 20/3226* (2013.01); *G06Q 20/3278* (2013.01); *G07F 19/203* (2013.01); *H04L 63/0876* (2013.01)

(56) References Cited

U.S. PATENT DOCUMENTS

| | | | | |
|---|---|---|---|---|
| 8,844,012 B1* | 9/2014 | Chan | ..................... | H04W 12/06 709/225 |
| 9,600,981 B2* | 3/2017 | Korala | ..................... | G07F 19/20 |
| 2006/0075303 A1 | 4/2006 | Ulrich et al. | | |
| 2012/0197740 A1* | 8/2012 | Grigg | ..................... | G06Q 20/20 705/16 |
| 2012/0197743 A1* | 8/2012 | Grigg | ..................... | G06Q 20/20 705/16 |
| 2013/0023241 A1 | 1/2013 | Lim | | |
| 2014/0101044 A1* | 4/2014 | Blackhurst | ........... | G06Q 20/385 705/44 |
| 2014/0164241 A1* | 6/2014 | Neuwirth | ............... | G06Q 20/12 705/44 |
| 2014/0258123 A1* | 9/2014 | Fernandes | ........... | G06Q 40/025 705/44 |
| 2014/0279444 A1* | 9/2014 | Kassemi | ............. | G06Q 20/102 705/39 |
| 2014/0289824 A1* | 9/2014 | Chan | ................. | G06F 16/24578 726/5 |
| 2016/0246958 A1* | 8/2016 | Zhang | ..................... | G06Q 20/12 |
| 2016/0253651 A1* | 9/2016 | Park | ........................ | G07F 9/023 705/39 |
| 2016/0358136 A1* | 12/2016 | Todasco | ................. | G06Q 20/10 |
| 2017/0063975 A1* | 3/2017 | Prakash | ............. | H04L 67/1002 |
| 2017/0221066 A1* | 8/2017 | Ledford | ............. | G06Q 20/4037 |

FOREIGN PATENT DOCUMENTS

| | | |
|---|---|---|
| KR | 10-2004-0025232 A | 3/2004 |
| KR | 10-2006-0089808 A | 8/2006 |
| KR | 10-2010-0124998 A | 11/2010 |
| KR | 10-0992573 B1 | 11/2010 |
| KR | 10-2013-0009551 A | 1/2013 |
| KR | 10-2015-0019378 A | 2/2015 |

OTHER PUBLICATIONS

International Search Report for PCT/KR2017/004479 dated Aug. 14, 2017 [PCT/ISA/210].

* cited by examiner ly, to a system and method for proceeding with a financial transaction in a financial terminal, such as an automated teller machine (ATM), using an approval number resulting from pre-approval.

BACKGROUND ART

With the development of smart-phone technology, various payments and financial transactions, which have been conventionally made using cash or credit cards, are conveniently being made through smart-phone applications these days.

A conventional ATM includes a processing device composed of a computer or the like for processing tasks related to depositing and withdrawing, a display device for displaying information related to depositing and withdrawing to customers, an input device for inputting transaction-related information, such as an account number and a secret number, and the like. When a touch panel display is used, the touch panel display may serve as both the display device and the input device.

When a person withdraws cash or makes a transfer transaction using the ATM, he or she authenticates an account in which he or she wants to make a transaction by inserting a cash card or a credit card or touching the ATM with a portable terminal such as a smart phone and then proceeds with the transaction.

When the user inputs information required for the transaction through the input device of the ATM, the processing device approves the transaction through communication with a server, and then the user may withdraw cash or finish the transaction such as an account transfer.

As described above, even in the case of a transaction employing an ATM and a smart phone or the like, it is necessary to proceed with the transaction after performing user authentication or account authentication using a method of touching the ATM with a smart phone or another method. Therefore, much waiting time is required for the transaction.

Also, when the ATM is touched with a smart phone, personal information such as account information is transferred, but the number of cases regarding ATM tampering is increasing these days. When a user is not aware of such a tampered ATM and proceeds with a transaction, the user's personal information may be leaked.

DISCLOSURE

Technical Problem

The present invention has been developed from the aforementioned background and is directed to providing a system and method for proceeding with a financial transaction, such as a cash withdrawal or a purchase of a gift certificate, by obtaining transaction approval in advance with a portable terminal through communication with a financial institution server or the like and then transferring only a result of the transaction approval to an automated teller machine (ATM) or the like.

Objectives of the present invention are not limited to the aforementioned objective, and other objectives which have not been mentioned will be clearly understood by those of ordinary skill in the art from the following description.

Technical Solution

One aspect of the present invention provides a financial transaction method based on pre-approval, the method including: running, by a user, a financial transaction application (app) of a portable terminal and extracting information for authentication from the portable terminal; transferring the information for authentication extracted from the portable terminal to a financial transaction server; comparing, by the financial transaction server, the information for authentication with authentication information previously stored in the financial transaction server to perform authentication; when a result of the authentication is received from the financial transaction server, inputting transaction information for a financial transaction into the portable terminal and transferring the transaction information to the financial transaction server; checking, by the financial transaction server, the received transaction information to approve the financial transaction and transferring approval information including an approval number to the portable terminal; and transferring, by the portable terminal, the received approval information to a financial terminal for proceeding with the financial transaction to proceed with the financial transaction.

Another aspect of the present invention provides a financial transaction system based on pre-approval, the system including: a portable terminal of a user configured to execute an app for a financial transaction, transfer information for authenticating the app and transaction information for the financial transaction to a financial transaction server, have the app authenticated, and receive and transfer an approval number for the financial transaction to a financial terminal; the financial transaction server configured to receive the information for authenticating the app from the portable terminal, compare the received information with previously stored information, transmit an app authentication result to the portable terminal, compare the transaction information for the financial transaction with previously stored information, and transfer an approval result of the financial transaction together with the approval number; and the financial terminal configured to check, when the approval number is received from the portable terminal, the approval number and then provide the financial transaction.

Advantageous Effects

According to the present invention, approval for a transaction is obtained in advance using a portable terminal without touching an automated teller machine (ATM), and then only an approval result is transferred to the ATM so that cash may be withdrawn or a gift certificate or the like may be issued. Therefore, it is possible to reduce a waiting time and prevent leakage of personal information such as an account number and a secret number.

In addition, not only in the case of an ATM but also in the case of a financial transaction for a general product purchase or the like, it is possible to obtain approval in advance by making a payment for the financial transaction or the like with a portable terminal, transfer the approval to a point-of-sale (POS) terminal or the like, and receive a product which is a transaction object. Therefore, a transaction time can be reduced, and security can be improved.

MODES OF THE INVENTION

Advantages and features of the present invention and methods for accomplishing the same will be more clearly understood from embodiments described below with reference to the accompanying drawings. However, the present invention is not limited to the following embodiments but may be implemented in various different forms. The embodiments are provided only to complete disclosure of the present invention and to fully convey the category of the invention to those of ordinary skill in the technical field pertaining to the present invention, and the present invention is defined by the appended claims. Meanwhile, terms used in this specification are for describing the embodiments rather than limiting the present invention. Unless expressly stated otherwise, singular forms include plural forms in this specification. As used herein, the word "comprises" and/or "comprising" do not preclude the presence or addition of one or more elements, steps, operations and/or devices other than stated elements, steps, operations and/or devices.

Hereinafter, exemplary embodiments of the present invention will be described in detail with reference to the accompanying drawings.

Figure 1:
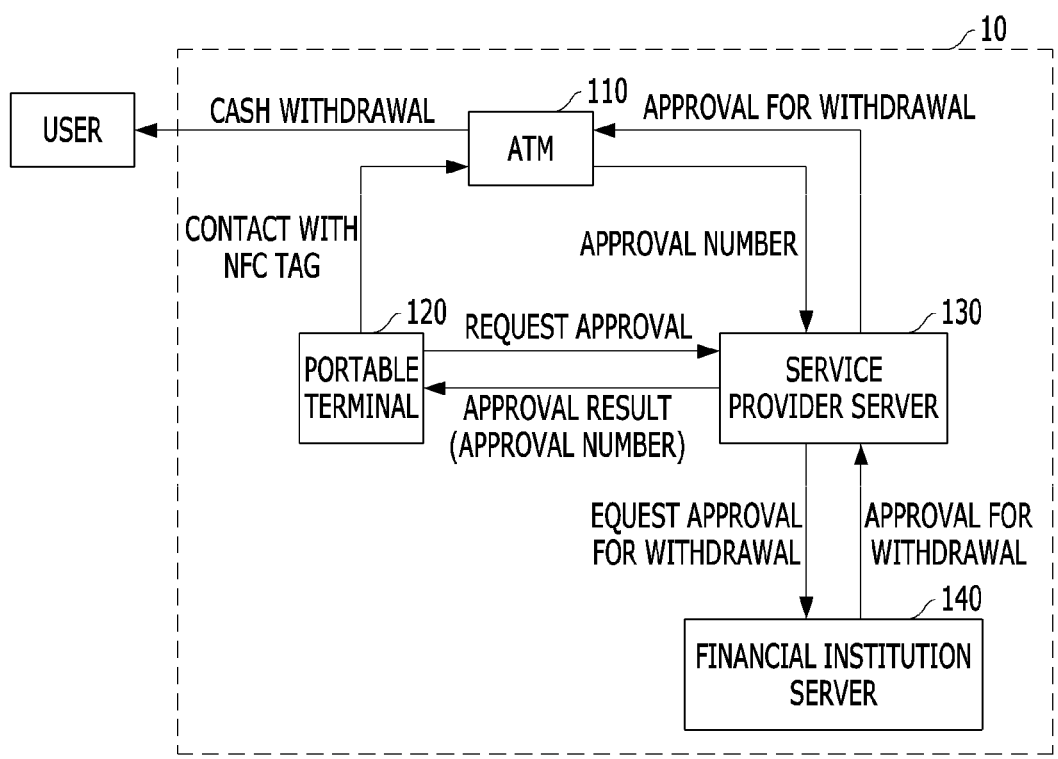
FIG. 1 is a structural diagram of a financial transaction system based on pre-approval according to an embodiment of the present invention.

FIG. 1 is a structural diagram of a system 10 for providing an automatic deposit and withdrawal service on the basis of pre-approval according to an embodiment of the present invention.

The system 10 includes an automated teller machine (ATM) 110, a portable terminal 120, a service provider server 130, and a financial institution server 140. The service provider server 130 and the financial institution server 140 may be the same server.

The ATM 110, the portable terminal 120, the service provider server 130, and the financial institution server 140 may be composed of at least one communication module for exchanging signals (or data) with an external device, at least one memory and at least one storage for storing applications (apps) required to perform functions and storing results of performing operations, a user interface for interfacing with a user, and at least one processor for performing functions.

The portable terminal 120 executes an app for pre-approved transaction and extracts and transfer a unique user identification (UUID), an app serial number, a telephone number, etc. to the service provider server 130, thereby requesting transaction approval.

The UUID is a unique serial number which is provided to the app when the app is downloaded from an app distribution server such as the App Store or GOOGLE Store. A varying UUID is issued every time an individual downloads the app, and the UUID is stored not in the app but in an operating system (OS) of the portable terminal 120. For this reason, it is possible to copy the app but not the stored UUID. Therefore, tampering of the app can be prevented.

The app serial number is issued by the service provider server 130 when the app is installed on the portable terminal 120 and authenticated. The app serial number is used to verify whether the app serial number coincides with membership information stored in the service provider server 130.

When an approval number resulting from transaction approval is received from the service provider server 130 after transaction approval is requested, the approval number is transferred to the ATM 110 using a near field communication (NFC) tag, a barcode, a quick response (QR) code, etc. so that a withdrawal may be made. When the ATM 110 does not have a communication function such as NFC, it is possible to directly input and transfer the approval number.

When information including the UUID, the app serial number, the telephone number, etc. is received from the portable terminal 120, the service provider server 130 determines whether a user of the portable terminal 120 is a member and whether the app has been tampered by comparing the received information with previously stored membership information and proceeds with pre-approval.

When the information received from the portable terminal 120 coincides with information stored in the service provider server 130, the service provider server 130 transfers transaction-related information received from the portable terminal 120 to the financial institution server 140, thereby requesting approval for a financial transaction.

When approval for the financial transaction is obtained together with an approval number from the financial institution server 140, the service provider server 130 transfers the approval result to the portable terminal 120, receives the approval number, which has been transferred from the portable terminal 120 to the ATM 110, from the ATM 110, and compares the received approval number with the stored approval number, thereby approving a withdrawal.

The financial institution server 140 or the service provider server 130 may validate the approval number for only a predetermined time when issuing the approval number. For example, a valid time of the approval number may be set to 10 minutes, one hour, or the like or personally set by a user.

When the approval number is received from the portable terminal 120 of the user, the ATM 110 may check the approval number by transferring the approval number to the server and then provide a pre-approved amount of money to the user. The ATM 110 may not only provide cash but also issue a gift certificate, a lottery ticket, and the like.

When the ATM 110 does not have a function for communication with a server or is a condition in which communication is not possible, the approval number may be verified by a self-verification solution, and then the amount of money may be provided to the user. A secure application module (SAM) and the like may be used as the self-verification solution.

The system 10 may include a point-of-sale (POS) terminal or the like instead of the ATM 110.

For example, to purchase a product, the user receives an approval number from the service provider server 130 or the financial institution server 140 and stores the approval number in the portable terminal 120. When the stored approval number is provided to a POS terminal or the like at a place in which the product is actually provided, a transaction may be made in a manner the POS terminal verifies the approval number by communicating with the server or through the self-verification solution and then provides the product to the user.

Figure 2:
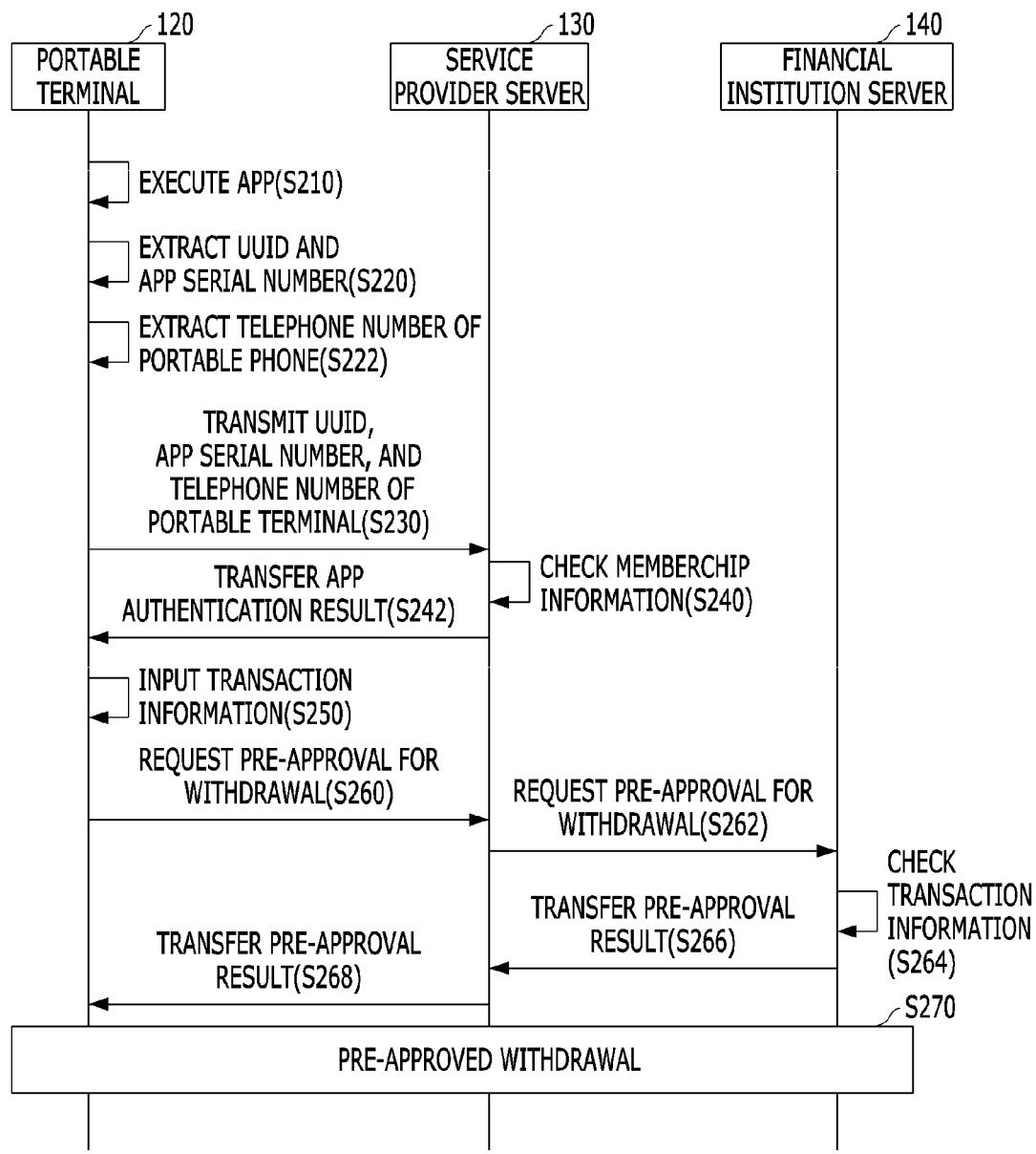
FIG. 2 is a sequence diagram of a financial transaction method based on pre-approval according to another embodiment of the present invention.

FIG. 2 is a sequence diagram of a method of providing an automatic deposit and withdrawal service on the basis of pre-approval according to another embodiment of the present invention.

When a user executes the app of the portable terminal 120 to proceed with a pre-approved transaction (S210), the UUID stored in the OS of the portable terminal 120 and the app serial number stored in the app are extracted (S220), and the telephone number of the portable terminal is extracted together (S222).

When the portable terminal uses ANDROID of GOOGLE as the OS, it is possible to directly extract the telephone number from the portable terminal. However, when it is not possible to extract the telephone number from the OS, such as iOS of Apple, it is necessary to extract the telephone number in another way and transfer the telephone number to the service provider server 130 or the financial institution server 140.

Figure 3:
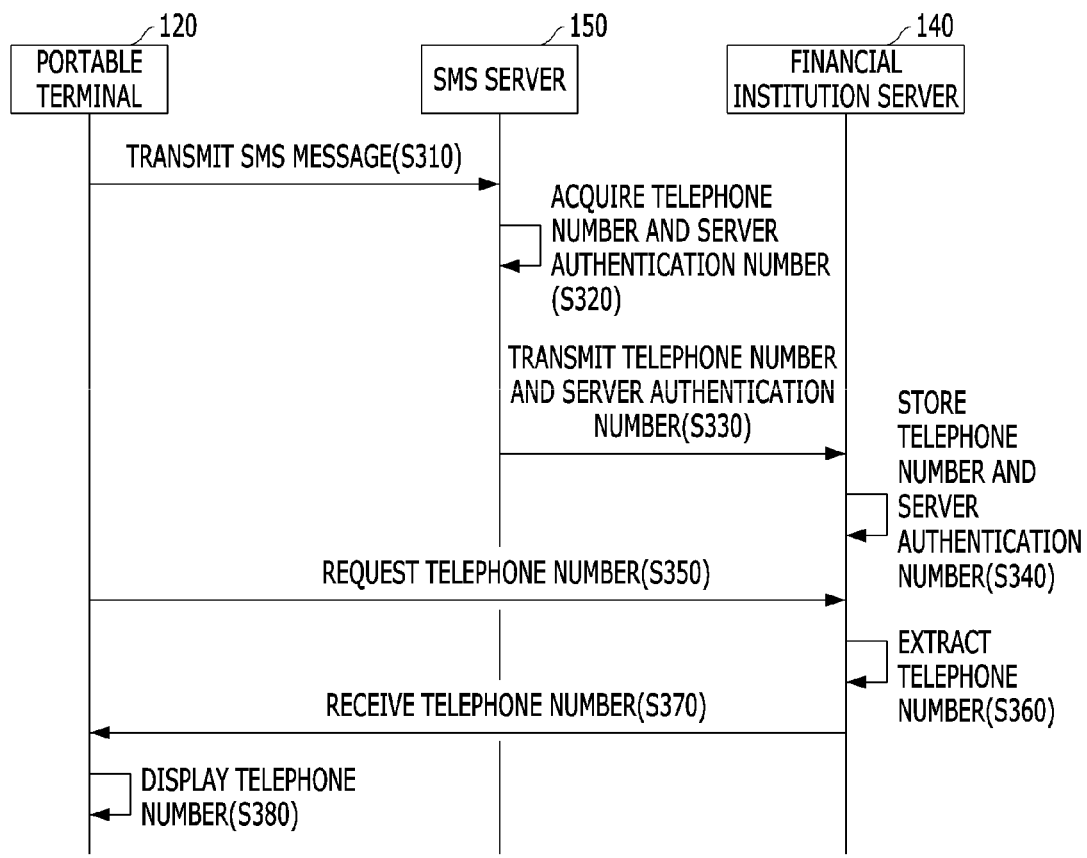
FIG. 3 is a sequence diagram of a method of extracting a telephone number of a portable terminal according to another embodiment of the present invention.

FIG. 3 is a sequence diagram showing a process of extracting a telephone number using a short message service (SMS). An SMS message should pass through an SMS server 150 so as to be transmitted, and a telephone number of a caller is included in the SMS message. For this reason, it is possible to extract the telephone number of the portable terminal 120.

The portable terminal 120 transmits an SMS message including a server authentication number to the SMS server 150 (S310).

The SMS server 150 acquires the telephone number and the server authentication number included in the SMS message by receiving the SMS message transmitted from the portable terminal 120 (S320) and transmits the telephone number and the server authentication number to the service provider server 130 (S330). The service provider server 130 stores the received telephone number and server authentication number of the portable terminal 120 (S340).

The SMS message passes through the SMS server 150, and in this process, the telephone number is automatically checked. Therefore, tampering of the telephone number can be prevented, and it is possible to detect a telephone number of a portable device, such as an IPHONE, whose device information cannot be acquired.

The portable terminal 120 requests the telephone number by transmitting the server authentication number to the service provider server 130 (S350), and the service provider server 130 compares the stored telephone number and the server authentication number with the server authentication number received from the portable terminal 120 and extracts the telephone number of the portable terminal 120 (S360).

The service provider server 130 transmits the telephone number to the portable terminal 120 of the user using the extracted telephone number (S370), and the portable terminal 120 receiving the telephone number automatically displays the received telephone number therein to prevent tampering of the telephone number (S380).

Unlike a conventional case in which a user personally inputs a telephone number of a portable device and requests an authentication number from a server of an authentication service provider, according to the above-described telephone number extraction method, a telephone number automatically extracted by a server is automatically input and displayed so that tampering of the telephone number can be prevented.

When extraction of the UUID, the app serial number, and the portable terminal telephone number is finished, the portable terminal 120 transmits personal information including the UUID, the app serial number, the portable terminal telephone number, etc. to the service provider server 130 for app authentication and user authentication (S230).

The service provider server 130 checks whether the user is a member and whether the app has been tampered by comparing membership information stored in an installation process and an authentication process of the app with the received UUID, app serial number, portable terminal telephone number, and the like (S240).

When checking of membership information is finished, the service provider server 130 transfers an app authentication result to the portable terminal 120, and the user inputs information for a withdrawal, for example, an account number, a financial institution name, the amount of withdrawal, a secret number, and the like (S250).

The secret number may be input through a keypad in a conventional manner. Also, two kinds of security authentication may be simultaneously performed in a manner in which when the secret number is input by the handwriting, the secret number is checked and the handwriting of the secret number is recognized and compared with signature information.

When inputting the information for the withdrawal, the user may input together the signature information or facial recognition information, iris recognition information, fingerprint information, etc. for which a camera of the portable terminal has been used and verify himself or herself so that security can be improved.

When the portable terminal 120 requests pre-approval for the withdrawal by transmitting the input transaction information and information for user authentication to the service provider server 130 (S250), the service provider server 130 verifies the user by comparing the information for user authentication with previously stored facial recognition information and the like and then requests pre-approval for the withdrawal from the financial institution server 140 (S252). At this time, functions of the service provider server 130 and the financial institution server 140 may be performed by one server.

The financial institution server 140 receiving the transaction information determines whether to approve the withdrawal by checking the financial institution name, the account number, the secret number, etc. (S264) and transfers a pre-approval result together with an approval number to the service provider server 130 or directly to the portable terminal 120 of the user (S256).

When the pre-approval result and the approval number are transferred to the service provider server 130, the service provider server 130 transfers the pre-approval result including the approval number to the portable terminal 120 again (S258).

The approval number may include valid time information of the approval number, and the valid time information may be set by a financial institution or personally set by a user.

The user may receive the approval number through the above approval procedure and conveniently proceed with a pre-approved withdrawal using the approval number (S260).

Figure 4:
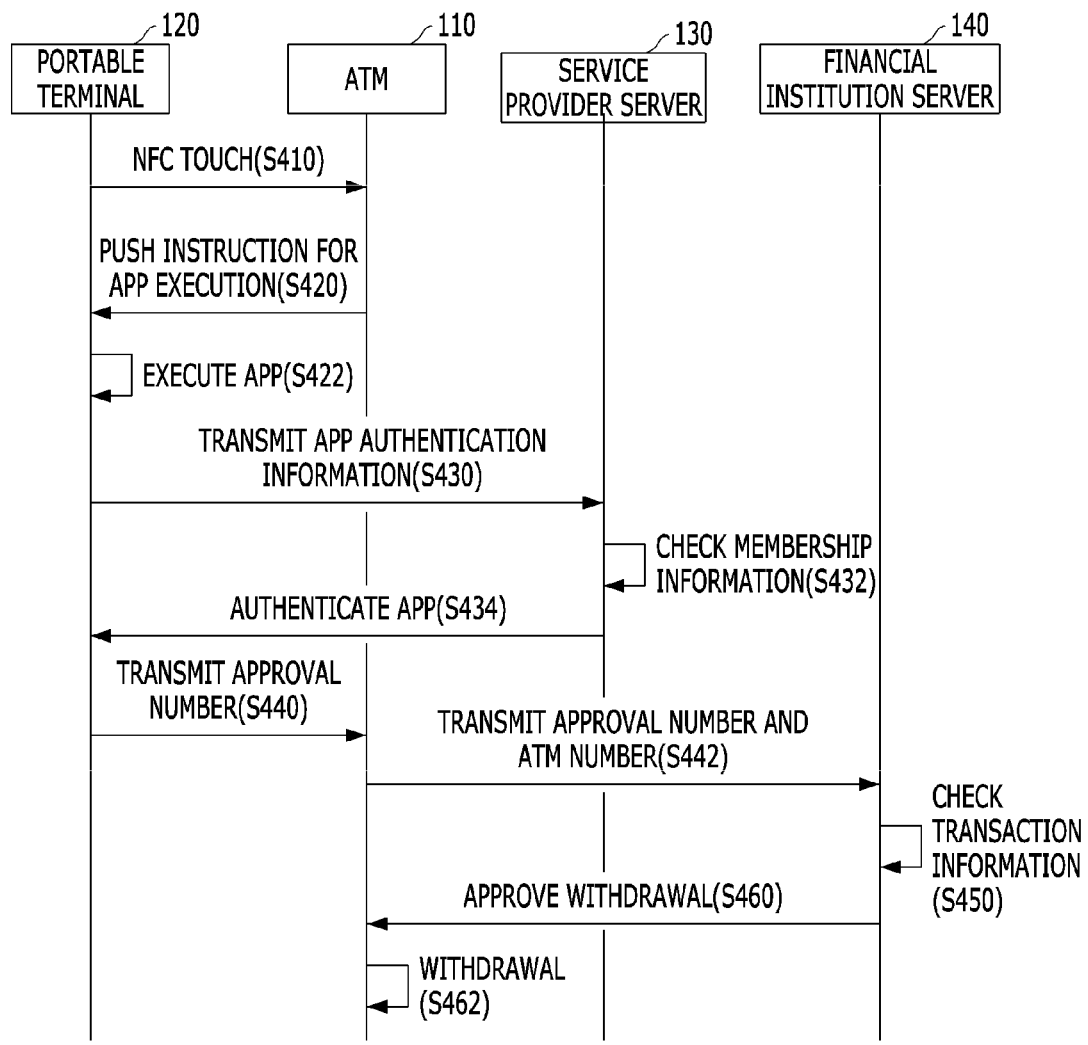
FIG. 4 is a sequence diagram of a method of proceeding with a financial transaction according to another embodiment of the present invention.

FIG. 4 is a sequence diagram showing in further detail the process (S260) in which the withdrawal is made after pre-approval.

To transfer the approval number from the portable terminal 120 to the ATM 110, an NFC chip of the portable terminal comes in contact with an NFC tag of the ATM 110 (S410).

When the NFC contact is made, the ATM 110 transmits an app execution instruction to the portable terminal 120 in a PUSH manner (S420). Even when a pre-approved withdrawal is selected first at the ATM 110, the app can be executed in the PUSH manner by touching the NFC tag with the portable terminal 120 thereafter. When the portable terminal 120 does not have the NFC function, the ATM 110 may generate a barcode or a QR code, and the portable terminal 120 may execute the app by reading the barcode or the QR code.

The portable terminal 120 receiving the PUSH instruction executes the app (S422) and transmits the UUID, the app serial number, the telephone number, etc. to the service provider server 130 (S430).

When the app is executed in advance without touching the NFC tag with the NFC chip of the portable terminal 120, it is unnecessary to receive the PUSH instruction for app execution, and thus it is possible to directly transmit authentication information for app authentication to the service provider server 130.

Information for app authentication may include biometric information, such as facial recognition, voice recognition, iris recognition, fingerprint recognition, and signature information, so that security can be improved.

The service provider server 130 determines whether the user of the portable terminal 120 is a member and whether the app has been tampered by comparing the received information with previously stored membership information (S432) and transmits an authentication result to the portable terminal (S434).

Since the above app authentication procedure is performed between the portable terminal 120 and the service provider server 130 within a short time that the user cannot recognize as soon as the portable terminal 120 executes the app, the user does not feel inconvenience.

When app authentication is finished, the portable terminal 120 transmits the approval number stored therein to the ATM 110 (S440). When the portable terminal 120 does not have the NFC function, the approval number can be transferred in a manner in which the portable terminal 120 generates a barcode or a QR code and the ATM 110 reads the generated barcode or QR code, or transferred by directly inputting the approval number into the ATM 110.

The ATM 110 receiving the approval number may verify the approval number by itself using a SAM scheme and proceed with the withdrawal (S462) or may check details of the transaction once again and then proceed with the withdrawal.

When proceeding with the withdrawal through communication with the financial institution server 140, the ATM 110 requests approval by transmitting the approval number received from the portable terminal 120 to the financial institution server 140 together with a number of the ATM 110 (S442).

The financial institution server 140 receiving the approval number compares transaction information, such as the approval number and the ATM number, with information which has been stored upon pre-approval and determines whether to approve the withdrawal (S450).

When the check of the transaction information is finished, the financial institution server 140 transfers an approval result to the ATM 110 (S460), and the user proceeds with the withdrawal based on pre-approval such that the transaction is finished (S462).

A case in which a user withdraws cash from the ATM 110 of a bank using the portable terminal 120 has been described above. However, the ATM 110 may not only provide cash of a bank account but may also issue a gift certificate, lottery ticket, etc. of a predetermined amount of money. The methods can also be used to make a transaction for a preset amount of money not in the ATM 110 but for an apparatus such as a lubricator and a POS terminal.

For example, when an approval number is provided to a lubricator, it is possible to supply an amount of prepaid oil, and when an approval number for an amount of prepaid money is suggested to a POS terminal, a transaction may be made in a manner in which a product for which the payment has been previously made is checked and provided to a user.

The above-described method of providing an automatic deposit and withdrawal service enables a user to proceed with an approval for a financial transaction in advance and to stop at an ATM or the like and make a withdrawal at a convenient time. Therefore, it is possible to reduce a waiting time for using an ATM. Also, since information transferred to an ATM is minimized, it is possible to prevent leakage of personal information caused by a tampered ATM and the like.

Although all components of the above-described embodiments of the present invention are described to be combined into one component or to operate in combination, the present invention is not limited to the embodiments. In other words, all the components may be selectively combined to operate within the objective scope of the present invention. Each of the components may be implemented by one independent piece of hardware, or some or all of the components may be selectively implemented by a computer program having program modules for executing functions of one or more pieces of hardware. The computer program may be stored in computer-readable media, such as a universal serial bus (USB) memory, a compact disk (CD), and a flash memory, and read and executed by a computer to implement embodiments of the present invention. The storage media of the computer program may include a magnetic recording medium, an optical recording medium, a carrier wave medium, and the like.

Although configurations of the present invention have been described in detail above with reference to the accompanying drawings, these are mere examples, and those of ordinary skill in the technical field to which the present invention pertains can make various modifications and changes within the technical spirit of the present invention. Therefore, the scope of the present invention should not be limited by the above-described embodiments but should be determined by the following claims.

The invention claimed is:

1. A method of securing a transaction between a portable terminal and a transaction terminal, the method comprising:
   storing, by a portable terminal, a unique user identifier (UUID) of an application in an operating system (OS) of the portable terminal and storing an app serial number in the application, wherein the UUID is a unique serial number which is variably issued each time the application is downloaded from an app distribution server, the UUID being not stored in the application, and the app serial number being issued by a service provider server when the application is installed on the portable terminal and authenticated;
   running, by the portable terminal, the application and extracting information for authentication, wherein the extracted information for authentication includes the UUID stored in the OS of the portable terminal and the app serial number stored in the application;
   transferring, by the portable terminal, the information for authentication to a transaction server;
   receiving from the transaction server, by the portable terminal, a result of authentication based on comparing the information for authentication, including the UUID and the app serial number, with authentication information previously stored in the transaction server;

based on the received result of authentication, receiving, by the portable terminal, transaction information for a transaction and transferring the transaction information to the transaction server;

receiving from the transaction server, by the portable terminal, approval information including an approval number based on the transaction information; and transferring to a transaction terminal, by the portable terminal, the received approval information based on which the transaction is performed with the transaction terminal without entering personal information of a user of the portable terminal into the transaction terminal.

2. The method of claim 1, wherein the extracted information for authentication further includes a telephone number of the portable terminal, and wherein extracting of the telephone number of the portable terminal comprises:

transmitting a short message service (SMS) message including a server authentication number from the portable terminal of the user to an SMS server;

extracting, by the SMS server, the telephone number of the portable terminal of the user and the server authentication number from the SMS message and transmitting the telephone number and the server authentication number to a service server;

storing, by the service server, the received telephone number of the portable terminal of the user and the server authentication number;

transmitting the server authentication number from the portable terminal of the user to the service server to request the telephone number of the portable terminal of the user;

comparing, by the service server, the stored server authentication number with the server authentication number received from the portable terminal of the user and extracting the telephone number of the portable terminal of the user stored together with the server authentication number; and receiving, by the portable terminal of the user, the extracted telephone number from the service server.

3. The method of claim 1, wherein the information for authentication includes at least one of signature information, facial recognition information, voice recognition information, iris recognition information, and fingerprint information.

4. The method of claim 1, wherein the approval information including the approval number includes valid time information of the approval number.

5. The method of claim 4, wherein the valid time information of the approval number is set in advance by the user of the portable terminal or an administrator of the transaction server.

6. The method of claim 1, wherein the transaction terminal comprises an automated teller machine (ATM) or a point-of-sale (POS) terminal.

7. The method of claim 1, wherein the transaction includes a cash withdrawal, issuance of a gift certificate, or issuance of a lottery ticket.

8. The method of claim 1, wherein the transaction server includes the service provider server configured to perform the authentication and an institution server configured to approve the transaction.

9. The method of claim 8, wherein the result of authentication is based on comparing the information for authentication, including the UUID and the app serial number, with membership information previously stored in the service provider server.

10. The method of claim 1, wherein the transferring of the approval number to the transaction terminal comprises transferring the approval number to the transaction terminal through near field communication (NFC), a barcode, a quick response (QR) code, or a numeric code.

11. The method of claim 1, wherein the transaction information for the transaction includes a secret number which is input to the portable terminal by handwriting.

12. A system for securing a transaction between a portable terminal and a transaction terminal, comprising:

a portable terminal configured to:

store a unique user identifier (UUID) of an application in an operating system (OS) of the portable terminal and store an app serial number in the application, wherein the UUID is a unique serial number which is variably issued each time the application is downloaded from an app distribution server, the UUID being not stored in the application, and the app serial number being issued by a service provider server when the application is installed on the portable terminal and authenticated;

execute the application and extract information for authentication, wherein the extracted information for authentication includes the UUID stored in the OS of the portable terminal and the app serial number stored in the application;

transfer information for authenticating the application and transaction information to a transaction server, and receive and transfer, based on a result of authentication of the application, approval information including an approval number for a transaction to a transaction terminal;

the transaction server configured to receive the information for authenticating the application from the portable terminal, compare the received information, including the UUID and the app serial number, with corresponding previously stored information, transmit the result of authentication to the portable terminal, compare the transaction information with corresponding previously stored information, and transfer the approval information including the approval number to the portable terminal; and the transaction terminal configured to check, based on the approval information received from the portable terminal, the approval information and perform the transaction.

13. A portable terminal comprising:

a storage configured to store an application;

at least one memory configured to store instructions;

at least one processor configured to access the at least one memory, read the instructions, and operate according to the instructions, the instructions comprising:

instructions to store a unique user identifier (UUID) of the application in an operating system (OS) of the portable terminal and store an app serial number in the application, wherein the UUID is a unique serial number which is variably issued each time the application is downloaded from an app distribution server, the UUID being not stored in the application, and the app serial number being issued by a service provider server when the application is installed on the portable terminal and authenticated;

instructions to execute the application and extracting information for authentication, wherein the extracted information for authentication includes the UUID stored in the OS of the portable terminal and the app serial number stored in the application;

instructions to transfer the information for authentication to a transaction server;

instructions to receive, from the transaction server, a result of authentication based on comparing the information for authentication, including the UUID and the app serial number, with authentication information previously stored in the transaction server;

instructions to, based on the received result of authentication, receive transaction information for a transaction and transfer the transaction information to the transaction server;

instructions to receive, from the transaction server, approval information including an approval number based on the transaction information; and instructions to transfer to a transaction terminal the received approval information based on which the transaction is performed with the transaction terminal.

* * * * *